US012687185B2

(12) United States Patent
Oono et al.

(10) Patent No.: US 12,687,185 B2
(45) Date of Patent: Jul. 21, 2026

(54) HYDRAULIC ACTUATOR

(71) Applicant: BRIDGESTONE CORPORATION, Tokyo (JP)

(72) Inventors: Shingo Oono, Tokyo (JP); Kazuaki Nomura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 19/114,796

(22) PCT Filed: Jun. 27, 2023

(86) PCT No.: PCT/JP2023/023859

§ 371 (c)(1),
(2) Date: Mar. 25, 2025

(87) PCT Pub. No.: WO2024/075346

PCT Pub. Date: Nov. 4, 2024

(65) Prior Publication Data

US 2026/0098550 A1 Apr. 9, 2026

(30) Foreign Application Priority Data

Oct. 7, 2022 (JP) ................................ 2022-162679

(51) Int. Cl.
*F15B 15/10* (2006.01)
*F15B 15/24* (2006.01)

(52) U.S. Cl.
CPC ............ *F15B 15/24* (2013.01); *F15B 15/103* (2013.01)

(58) Field of Classification Search
CPC ..................................................... F15B 15/103
See application file for complete search history.

(56) References Cited

U.S. PATENT DOCUMENTS

| | | | | |
|---|---|---|---|---|
| 5,019,121 A * | 5/1991 | Krauter | A61B 1/008 92/92 |
| 5,083,498 A * | 1/1992 | Sato | F15B 15/103 92/92 |

(Continued)

FOREIGN PATENT DOCUMENTS

| | | |
|---|---|---|
| JP | H05-172118 A | 7/1993 |
| JP | 2007-068794 A | 3/2007 |

(Continued)

OTHER PUBLICATIONS

Extended European Search Report dated Oct. 16, 2025, issued in corresponding EP Patent Application No. 23874480.9.

(Continued)

*Primary Examiner* — Thomas E Lazo
(74) *Attorney, Agent, or Firm* — SOLARIS Intellectual Property Group, PLLC

(57) ABSTRACT

A hydraulic actuator includes a cylindrical tube, a sleeve, a restricting member, first and second sealing members, and a positioning member. The tube expands and contracts with pressure of a fluid. The sleeve covers an outer circumferential surface of the tube, and is widened in radial directions by expansion of the tube while limiting elongation of the tube in an axial direction S. The restricting member is provided radially inward of the sleeve, from one side to the other side in the axial direction S, and resists compression along the axial direction but is deformable in an intersecting direction X intersecting the axial direction. The sealing members seal respective ends of the tube at the one side and other side in the axial direction S. The positioning member is provided at a circumferential direction portion of at least one of the sealing members. The positioning member positions the restricting member to follow the axial direction.

6 Claims, 7 Drawing Sheets

(56) References Cited

U.S. PATENT DOCUMENTS

| | | | |
|---|---|---|---|
| 5,203,319 | A | 4/1993 | Danna et al. |
| 2014/0314976 | A1 | 10/2014 | Niiyama et al. |

FOREIGN PATENT DOCUMENTS

| | | | | |
|---|---|---|---|---|
| JP | 2021-088998 | A | | 6/2021 |
| JP | 2021088999 | A | * | 6/2021 |

OTHER PUBLICATIONS

International Search Report issued in International Application No. PCT/JP2023/023859 on Aug. 1, 2023.

* cited by examiner

HYDRAULIC ACTUATOR

TECHNICAL FIELD

The present disclosure relates to a hydraulic actuator.

BACKGROUND ART

Japanese Patent Application Laid-Open (JP-A) No. 2021-088999 discloses a hydraulic actuator that is a cylindrical tube, which expands and contracts in accordance with pressure of a fluid, and a structure with extensibility, in which fiber cords arranged in predetermined directions are woven.

This hydraulic actuator is provided with a sleeve that covers an outer circumferential surface of the tube and sealing members that seal ends in the axial direction of the tube. The hydraulic actuator is provided with a restricting member provided inside the sleeve from one end to the other end in the axial direction. The restricting member resists compression in the axial direction and is capable of deforming in an intersecting direction that intersects the axial direction.

SUMMARY OF INVENTION

Technical Problem

When a hydraulic actuator with the structure recited in JP-A No. 2021-088999 is being assembled, aligning a direction of extension of the restricting member with the axial direction of the tube is difficult.

An object of the present disclosure is to provide a hydraulic actuator in which aligning a direction of extension of a restricting member with an axial direction of a tube is easier.

Solution to Problem

A hydraulic actuator according to a first aspect includes: a cylindrical tube that expands and contracts in accordance with pressure of a fluid; a sleeve that covers an outer circumferential surface of the tube and that is widened in a radial direction by expansion of the tube while limiting elongation of the tube in an axial direction; a restricting member that is provided radially inward of the sleeve from one side to another side in the axial direction, the restricting member resisting compression along the axial direction and being deformable in an intersecting direction that intersects the axial direction; a pair of sealing members that seal respective ends of the tube at the one side and the other side in the axial direction; and a positioning member that is provided at a portion in a circumferential direction of at least one of the pair of sealing members, the positioning member positioning the restricting member such that the restricting member follows the axial direction.

According to this hydraulic actuator, because the positioning member that positions the restricting member so as to follow the axial direction is provided at at least one of the axial direction sealing members, assembling the hydraulic actuator such that the restricting member is along the axial direction is easy.

In a hydraulic actuator according to a second aspect, in the hydraulic actuator according to the first aspect, the positioning member is at the one side in the axial direction relative to the end of the tube.

According to this hydraulic actuator, because the positioning member is at the one side in the axial direction relative to the end of the tube, the end of the tube does not interfere with the positioning member when the hydraulic actuator is being assembled, and the restricting member may be positioned with ease.

In a hydraulic actuator according to a third aspect, in the hydraulic actuator according to the first aspect or the second aspect, the positioning member includes a pair of projections between which the restricting member is disposed, the pair of projections limiting movement of the restricting member in the circumferential direction.

According to this hydraulic actuator, the positioning member may be formed with ease by provision of the projections at the sealing member.

In a hydraulic actuator according to a fourth aspect, in the hydraulic actuator according to any one of the first to third aspects, the positioning member includes a second projection that limits movement of the restricting member in the axial direction at the sealing member.

According to this hydraulic actuator, because the second projection that limits movement of the restricting member in the axial direction is included, the hydraulic actuator is easier to assemble such that the restricting member follows the axial direction than a structure that does not include the second projection.

In a hydraulic actuator according to a fifth aspect, in the hydraulic actuator according to any one of the first to fourth aspects, the sealing member includes: an insertion portion that is inserted into the end of the tube, and a crimping member in a range of the insertion portion from the positioning member, the crimping member crimping the tube, the sleeve, and the restricting member to the sealing member from radially outward.

According to this hydraulic actuator, the restricting member may be crimped and fixed together with the tube and the sleeve.

In a hydraulic actuator according to a sixth aspect, in the hydraulic actuator according to any one of the first to fifth aspects, the positioning member is provided at both of the pair of sealing members.

According to this hydraulic actuator, the positioning member that positions the restricting member so as to follow the axial direction is provided at the sealing member at the one end in the axial direction and at the sealing member at the other end. Therefore, a hydraulic actuator may be provided in which, in a state in which torsion of the tube is reduced, aligning the direction of extension of the restricting member with the axial direction of the tube is easy.

Advantageous Effects of Invention

According to the present disclosure, a hydraulic actuator may be provided in which aligning a direction of extension of a restricting member with an axial direction of a tube is easy.

DETAILED DESCRIPTION

Below, exemplary embodiments embodying the technology of the present disclosure are described in detail with reference to the attached drawings.

Structural elements and processes that are responsible for the same operations and functions may be assigned the same reference symbols in all the drawings and duplicative descriptions thereof may be omitted as appropriate. The present disclosure is not limited by the exemplary embodiments described below. Further appropriate modifications may be embodied within the scope of the object of the present disclosure.

First Exemplary Embodiment

Structure of Hydraulic Actuator 20

Figure 1:
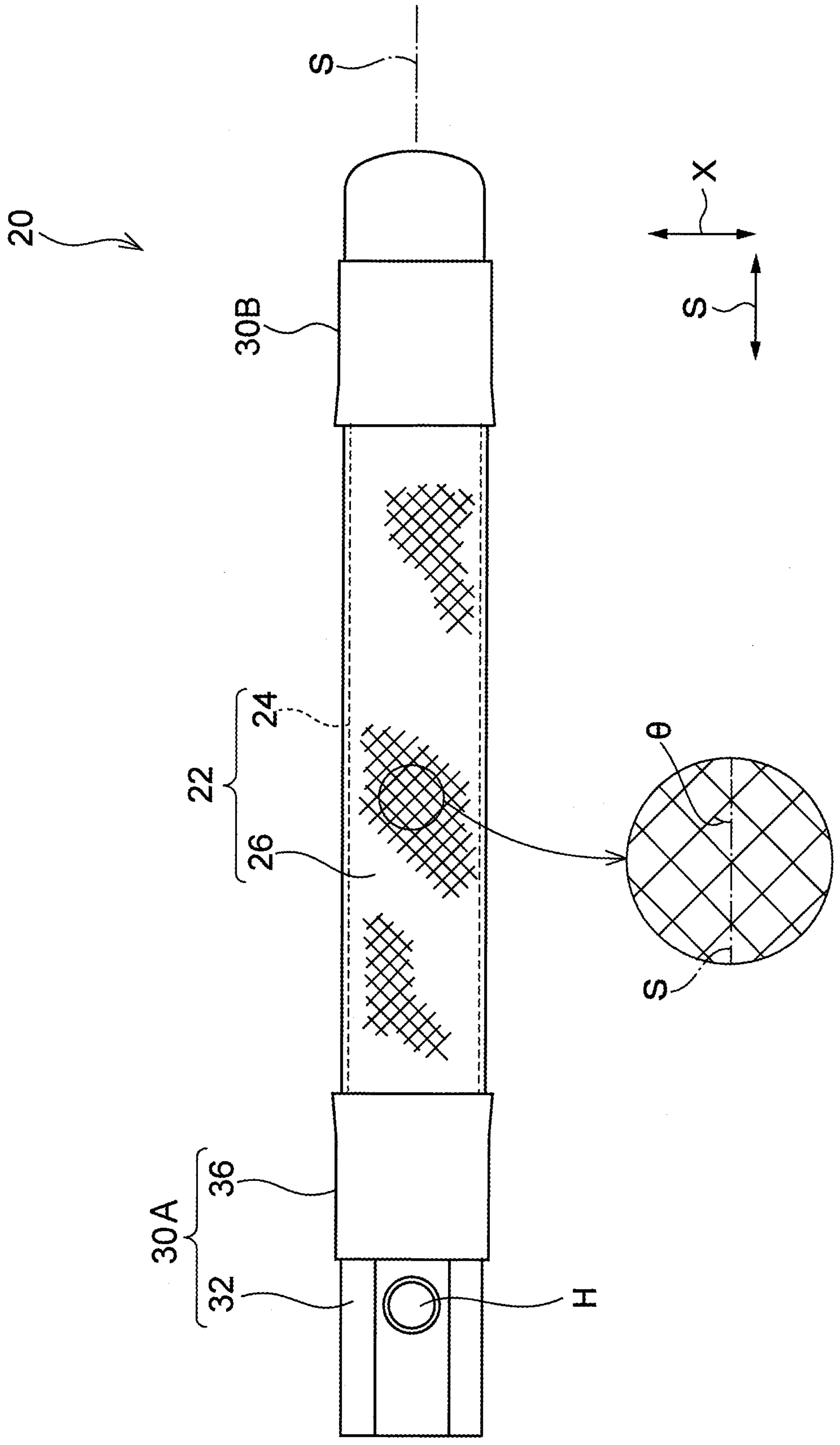
FIG. 1 is a plan view of a hydraulic actuator according to a first exemplary embodiment of the present disclosure.

FIG. 1 shows the hydraulic actuator 20 according to the first exemplary embodiment of the present disclosure. The hydraulic actuator 20 includes an actuator main body 22, a first sealing member 30A and a second sealing member 30B.

Figure 2:
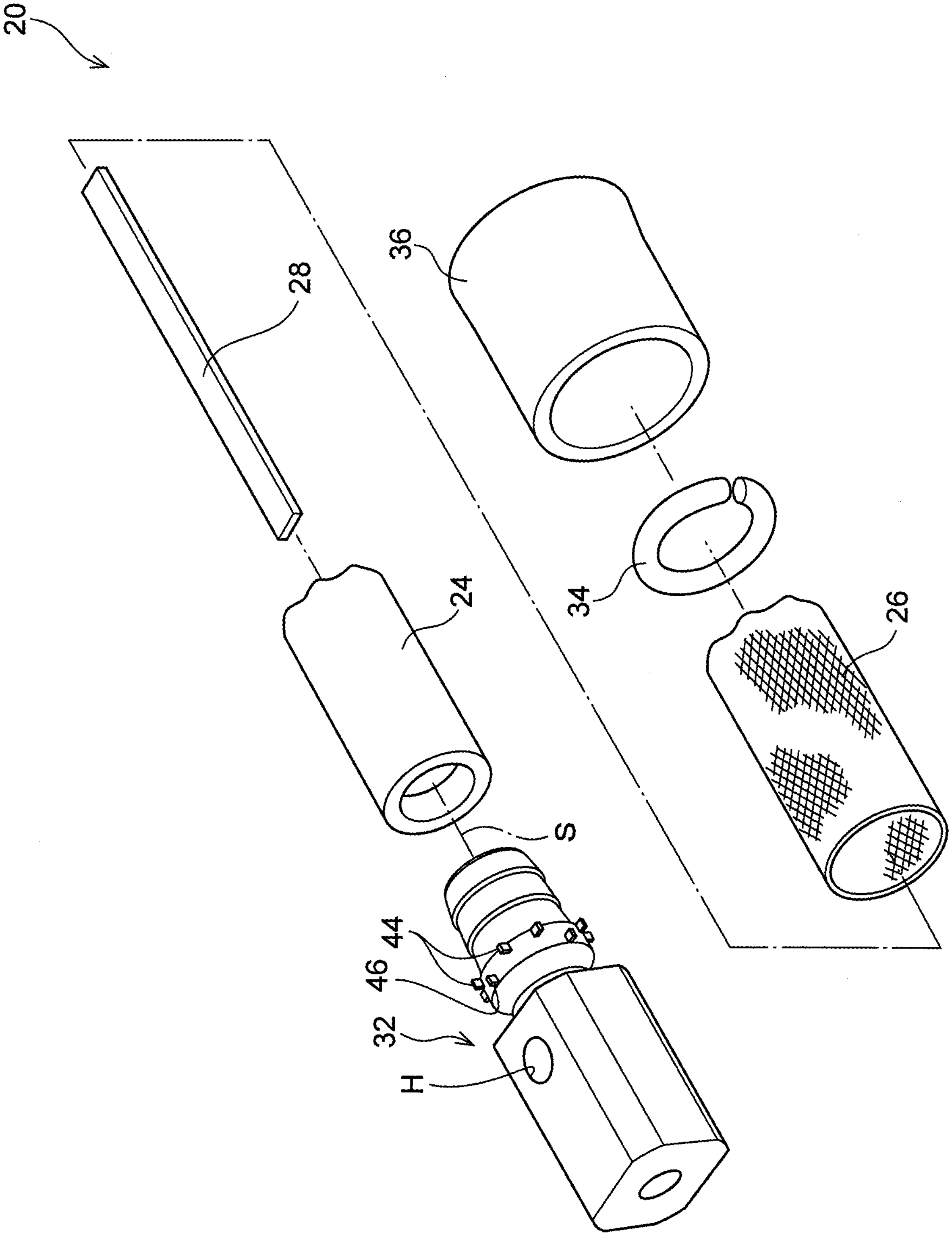
FIG. 2 is an exploded perspective view of one end in an axial direction of the hydraulic actuator according to the first exemplary embodiment of the present disclosure.

As is also shown in FIG. 2, the actuator main body 22 includes a tube 24, a sleeve 26 and a restricting member 28. The tube 24 has a cylindrical shape that is extensible by resilient deformation, which is expanded and contracted by pressure changes of an internal fluid. An axial direction S of the tube 24 is referred to as "the axial direction S". The tube 24 may be structured of a resilient material such as butyl rubber or the like. Air may be employed as a fluid supplied to the tube 24, in which case the hydraulic actuator 20 is a pneumatic actuator. However, if the hydraulic actuator 20 is driven by oil pressure, the tube 24 preferably employs an NBR (nitrile rubber) with high oil resistance or at least one material selected from the group consisting of hydrogenated NBR, chloroprene rubber and epichlorohydrin rubber.

The sleeve 26 is in a cylindrical shape covering the outer circumference of the tube 24. The sleeve 26 is a structure with extensibility in which fiber cords that are arranged in predetermined directions are woven. The arranged cords intersect with the axial direction S at predetermined angles θ. Because the sleeve 26 has this shape, the sleeve 26 undergoes pantograph deformation that changes the angles θ, following contraction and expansion of the tube 24 while limiting this contraction and expansion.

As the cords structuring the sleeve 26, it is preferable to employ fiber cords of an aromatic polyamide (aramide fibers), polyethylene terephthalate (PET) or the like. However, the fiber cords are not limited to these kinds of fiber. For example, alternative high-strength fiber cords such as poly p-phenylene benzobisoxazole (PBO) fibers or the like are applicable.

The restricting member 28 is provided between the tube 24 and the sleeve 26. The restricting member 28 has a long, narrow plate shape with the length direction arranged in a direction along the axial direction S of the tube 24. The restricting member 28 covers a portion of the outer circumference of the tube 24 and is disposed from one end to the other end of the tube 24.

The restricting member 28 is formed of a material that is not expanded or contracted by pressure, but that can deform by bending in a direction such that end portions thereof approach one another. The restricting member 28 that is employed may be what is known as a plate spring. Dimensions of the plate spring are determined in accordance with the size of the hydraulic actuator 20, a required retention force and the like. A material of the plate spring is not particularly limited, but materials that easily deform by bending but are strong against compression are typically applicable, such as metals such as stainless steel and the like. Alternatively, the restricting member 28 may be formed by a thin plate of carbon fiber-reinforced plastic (CFRP) or the like.

The first sealing member 30A includes a seal connector 32, an anchor ring 34 and a crimping member 36.

The seal connector 32 includes an integrally formed cap portion 32A and an insertion portion 32B. The cap portion 32A is formed in a substantially cuboid shape with larger diameters than the outer diameter of the tube 24. The insertion portion 32B is formed to extend in the axial direction S from the middle of one end side of the cap portion 32A. The insertion portion 32B is formed in a "mushroom" shape including an anchor portion 48 and a large diameter portion 50. The insertion portion 32B is inserted into one end side of the tube 24 inside the sleeve 26. The anchor portion 48 is a portion, at the other end side in the axial direction S of the insertion portion 32B, in a cylindrical shape with a smaller diameter than the cap portion 32A and the insertion portion 32B. The large diameter portion 50 is a portion, at the one end side in the axial direction S of the anchor portion 48, that is formed with a larger diameter than the anchor portion 48 and an inner diameter of the tube 24. The large diameter portion 50 includes positioning members. A metal such as stainless steel or the like may be excellently employed as the first sealing member 30A, but this metal is not a limitation. A hard plastic material or the like may be employed as the first sealing member 30A. The positioning members are described below.

A radial direction central portion of the insertion portion 32B includes a channel R (see FIG. 5) that is formed extending in the axial direction S and that is in fluid communication with a connection hole H in a side face of the cap portion 32A. An air supply hose, which is not shown in the drawings, is connected to the connection hole H and compressed air is supplied to the channel R.

The anchor ring 34 is formed in a ring shape and disposed at the outer side of the sleeve 26 so as to sandwich the sleeve 26 between the anchor ring 34 and the anchor portion 48. The anchor ring 34 anchors the sleeve 26 to the seal connector 32. The sleeve 26 is folded back round the anchor ring 34 to the outer circumference. A material such as a metal, hard plastic, fibers, rubber or the like may be employed as the anchor ring 34.

The crimping member 36 is disposed so as to cover the outer circumference of the actuator main body 22 at a portion in which the insertion portion 32B is inserted, and crimps the actuator main body 22 to the seal connector 32. Thus, the actuator main body 22 is crimped to the seal connector 32. A metal such as an aluminium alloy, brass, iron or the like may be employed for the crimping member 36.

Figure 3:
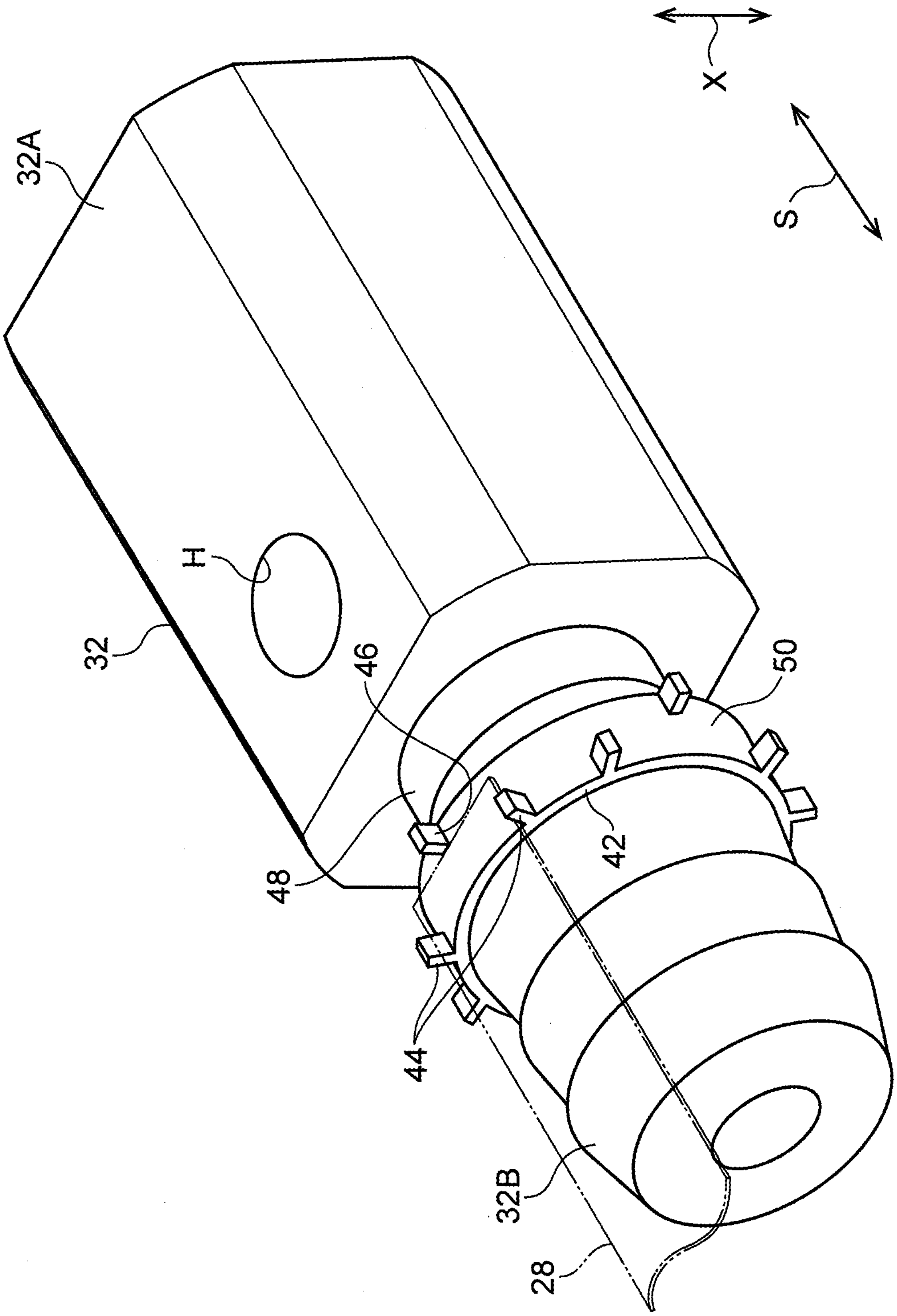
FIG. 3 is a perspective view depicting a sealing member according to the first exemplary embodiment of the present disclosure.
Figure 4:
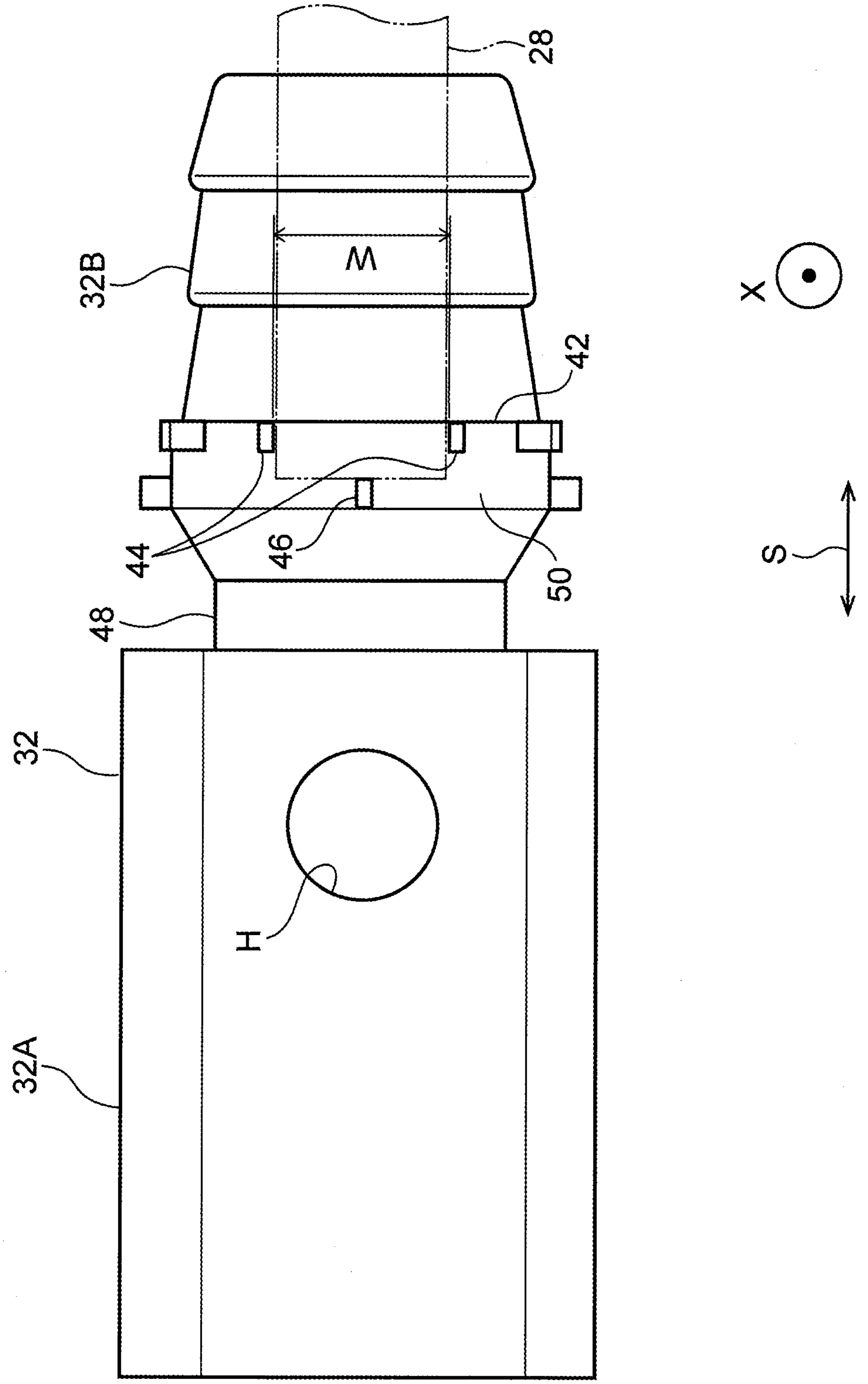
FIG. 4 is a plan view depicting the sealing member according to the first exemplary embodiment of the present disclosure.

As shown in FIG. 2 to FIG. 4, positioning members in the present exemplary embodiment include a pair of first projections 44 and a second projection 46, which project from the large diameter portion 50 of the insertion portion 32B. In the present exemplary embodiment, the first projections 44 and second projection 46 position the restricting member 28 such that a plate surface of the restricting member 28 is oriented in the same directions as a surface of the seal connector 32 in which the connection hole H is formed.

As shown in FIG. 3 and FIG. 4, the pair of the first projections 44 project outward in the radial direction from one side in the axial direction S of the large diameter portion 50 (the side thereof at which the insertion portion 32B is disposed). The pair of first projections 44 are projection-shaped portions that are formed opposing one another with a spacing W in the circumferential direction that is slightly wider than a width of the restricting member 28. The meaning of the term "spacing that is slightly wider" is intended to include a spacing of a size that fits the restricting member 28 with play, as described below. A specific dimension is to be suitably designed in accordance with the width of the restricting member 28.

As shown in FIG. 3 and FIG. 4, the second projection 46 projects outward from one side in the axial direction S of the large diameter portion 50 (the side thereof at which the cap portion 32A is disposed). The second projection 46 is a projection-shaped portion that is formed between the pair of first projections 44 in the circumferential direction.

In the present exemplary embodiment, a step 42 is at one side in the axial direction S of the large diameter portion 50. As described below, an inserted end portion of the tube 24 may be butted against the insertion portion 32B at the step 42.

In the present exemplary embodiment, as shown in FIG. 3 and FIG. 4, sets of the first projections 44 and the second projection 46 are formed at four locations in the circumferential direction of the large diameter portion 50, spaced apart by substantially 90°. Circumferential direction positions and numbers of the plural first projections 44 and second projections 46 are to be suitably designed together with the restricting member 28 as described below.

The second sealing member 30B includes a seal connector 33, the anchor ring 34 and the crimping member 36. The seal connector 33 is similar to the seal connector 32 of the first sealing member 30A except that the connection hole H and the channel R are not formed, and a distal end of the seal connector 33 is formed in a rounded shape.

Now, an assembly procedure of the hydraulic actuator 20 according to the present exemplary embodiment is described.

Assembly of the Hydraulic Actuator 20

Figure 5:
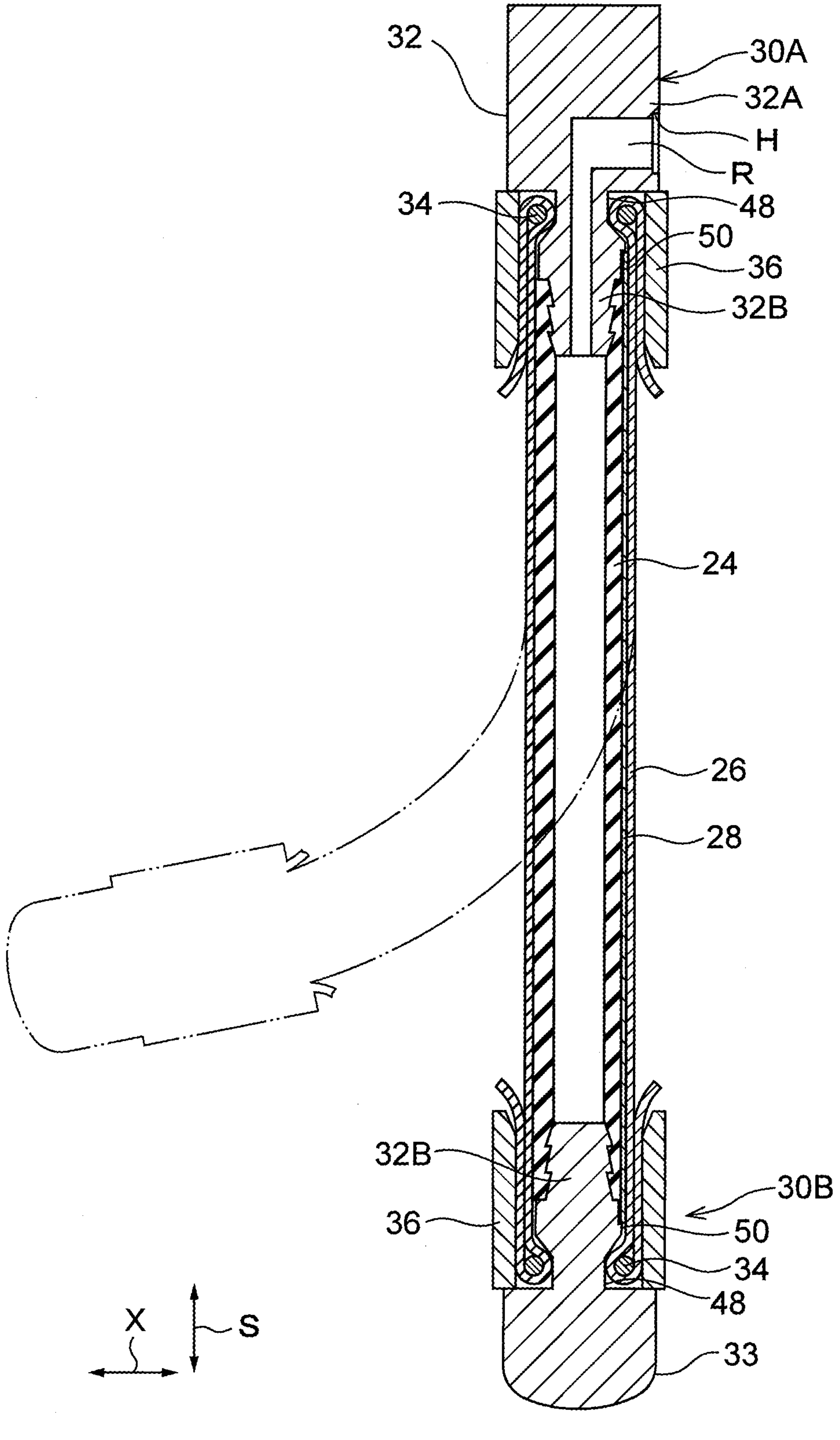
FIG. 5 is a sectional diagram depicting operation states of the hydraulic actuator according to the first exemplary embodiment of the present disclosure.

As shown in FIG. 2 and FIG. 5, at one end side of the hydraulic actuator 20 according to the present exemplary embodiment, the first sealing member 30A and the actuator main body 22 are assembled as follows.

First, the insertion portion 32B of the first sealing member 30A is inserted until one end of the tube 24 butts against the step 42. Then, the restricting member 28 is disposed between the pair of first projections 44 while being butted against the second projection 46 (see the upper diagram in FIG. 2). Thus, the restricting member 28 is contacted from both sides in the circumferential direction and movement of the restricting member 28 is limited by the pair of first projections 44, and movement of the restricting member 28 to the one side in the axial direction S (the side at which the cap portion 32A is disposed) is limited by the second projection 46. In other words, the pair of first projections 44 position the restricting member 28 such that the restricting member 28 follows the axial direction S. A circumferential direction position at which the restricting member 28 is disposed is at the outer side of a direction in which the actuator main body 22 is to bend as described below (a direction intersecting the axial direction S).

The sleeve 26 covers the outer circumferential surface of the restricting member 28 while being engaged with the tube 24 and the cap portion 32A of the first sealing member 30A. The anchor ring 34 is installed at the position of the anchor portion 48 from radially outward of the sleeve 26. Thus, the sleeve 26 is anchored at the anchor portion 48.

The sleeve 26 is turned back to the insertion portion 32B of the first sealing member 30A such that the anchor ring 34 is inward of the sleeve 26. The crimping member 36 is disposed so as to cover the insertion portion 32B and the anchor portion 48 from radially outward of the sleeve 26, and is crimped by a crimper that is not shown in the drawings. Thus, the tube 24, the restricting member 28 and the sleeve 26 are fixed to the first sealing member 30A at the one side in the axial direction S of the actuator main body 22.

At the other side in the axial direction S of the tube 24, sleeve 26 and restricting member 28, the restricting member 28 is passed between the first projections 44 of the large diameter portion 50 at the second sealing member 30B and butted against the second projection 46.

Then, with care that the restricting member 28 does not disengage from between the first projections 44 of the second sealing member 30B, the insertion portion 32B of the second sealing member 30B is inserted into the other side in the axial direction S of the tube 24.

The sleeve 26 covers the outer circumferential surface of the restricting member 28 while being engaged with the tube 24 and the cap portion 32A of the second sealing member 30B. The anchor ring 34 is installed at the position of the anchor portion 48 from radially outward of the sleeve 26. Thus, the sleeve 26 is anchored at the anchor portion 48.

The sleeve 26 is turned back to the insertion portion 32B of the second sealing member 30B such that the anchor ring 34 is inward of the sleeve 26. The crimping member 36 is disposed so as to cover the insertion portion 32B and the anchor portion 48 from radially outward of the sleeve 26, and is crimped by a crimper that is not shown in the drawings. Thus, the tube 24, the restricting member 28 and the sleeve 26 are fixed to the second sealing member 30B at the other side in the axial direction S of the actuator main body 22.

The one side and the other side of the tube 24 are sealed with the first sealing member 30A and the second sealing member 30B by the procedure described above. Thus, the hydraulic actuator 20 is assembled.

Now, operation of the hydraulic actuator 20 according to the present disclosure is described.

Operation of the Hydraulic Actuator 20

As illustrated in FIG. 5, the hydraulic actuator 20 is set and employed such that the first sealing member 30A at the one end is secured and the second sealing member 30B at the other end is a free end.

When compressed air flows in through the connection hole H, pressure inside the hydraulic actuator 20 rises. As the pressure rises, the tube 24 resiliently deforms and expands, the sleeve 26 undergoes pantograph deformation such that the angles θ increase, and force acts in a direction to shorten the length of the actuator main body 22. At this time, shortening of an outer circumferential sidewall of the actuator main body 22 at which the restricting member 28 is disposed is limited by the restricting member 28. Therefore, an outer circumferential wall of the actuator main body 22 at the side at which the restricting member 28 is not disposed, as viewed in the axial direction S, shortens. As a result, the restricting member 28 deforms by bending and the whole of the actuator main body 22 curves, as depicted by the two-dot chain lines in FIG. 5.

In the present disclosure, because the restricting member 28 has some length in the width direction thereof, the restricting member 28 is unlikely to curve in a direction other than the plate thickness direction of the restricting member 28, which is the direction intersecting the axial direction S at the first sealing member 30A and second sealing member 30B (below referred to as the intersecting direction X). That is, as shown in FIG. 5, the restricting member 28 curves in the direction toward the axial center of the tube 24.

Now, operation and effects due to the hydraulic actuator 20 according to the present disclosure are described.

Operation and Effects

In the hydraulic actuator 20 according to the present disclosure, because the first projections 44 that position the restricting member 28 so as to follow the axial direction S are provided at one or both of the first sealing member 30A and the second sealing member 30B, assembling the hydraulic actuator 20 such that the restricting member 28 is along the axial direction S is easier.

According to the hydraulic actuator 20 of the present disclosure, because the first projections 44 are provided at the one side in the axial direction S relative to the end of the tube 24, the end of the tube 24 and the positioning members do not interfere when the hydraulic actuator 20 is being assembled, and the restricting member 28 may be positioned with ease.

According to the hydraulic actuator 20 of the present disclosure, the positioning members may be formed with ease by the provision of the first projections 44 at the first sealing member 30A and the second sealing member 30B.

According to the hydraulic actuator 20 of the present disclosure, because the hydraulic actuator 20 further includes the second projection 46 that limits movement of the restricting member 28 in the axial direction S, the hydraulic actuator 20 is easier to assemble such that the restricting member 28 follows the axial direction S than a structure that does not include the second projection 46.

According to the hydraulic actuator 20 of the present disclosure, the restricting member 28 may be crimped together with and fixed to the tube 24 and the sleeve 26.

According to the hydraulic actuator 20 of the present disclosure, because the first projections 44 that position the restricting member 28 so as to follow the axial direction S are provided at the first sealing member 30A at the one end in the axial direction S and at the second sealing member 30B at the other end, the hydraulic actuator 20 may be provided in which, in a state in which torsion of the tube 24 is reduced, aligning the direction of extension of the restricting member 28 with the axial direction S of the tube 24 is easy.

Second Exemplary Embodiment

Now, a second exemplary embodiment is described. In the present exemplary embodiment, portions that are the same as in the first exemplary embodiment are assigned the same reference symbols and detailed descriptions thereof are not given.

Figure 6:
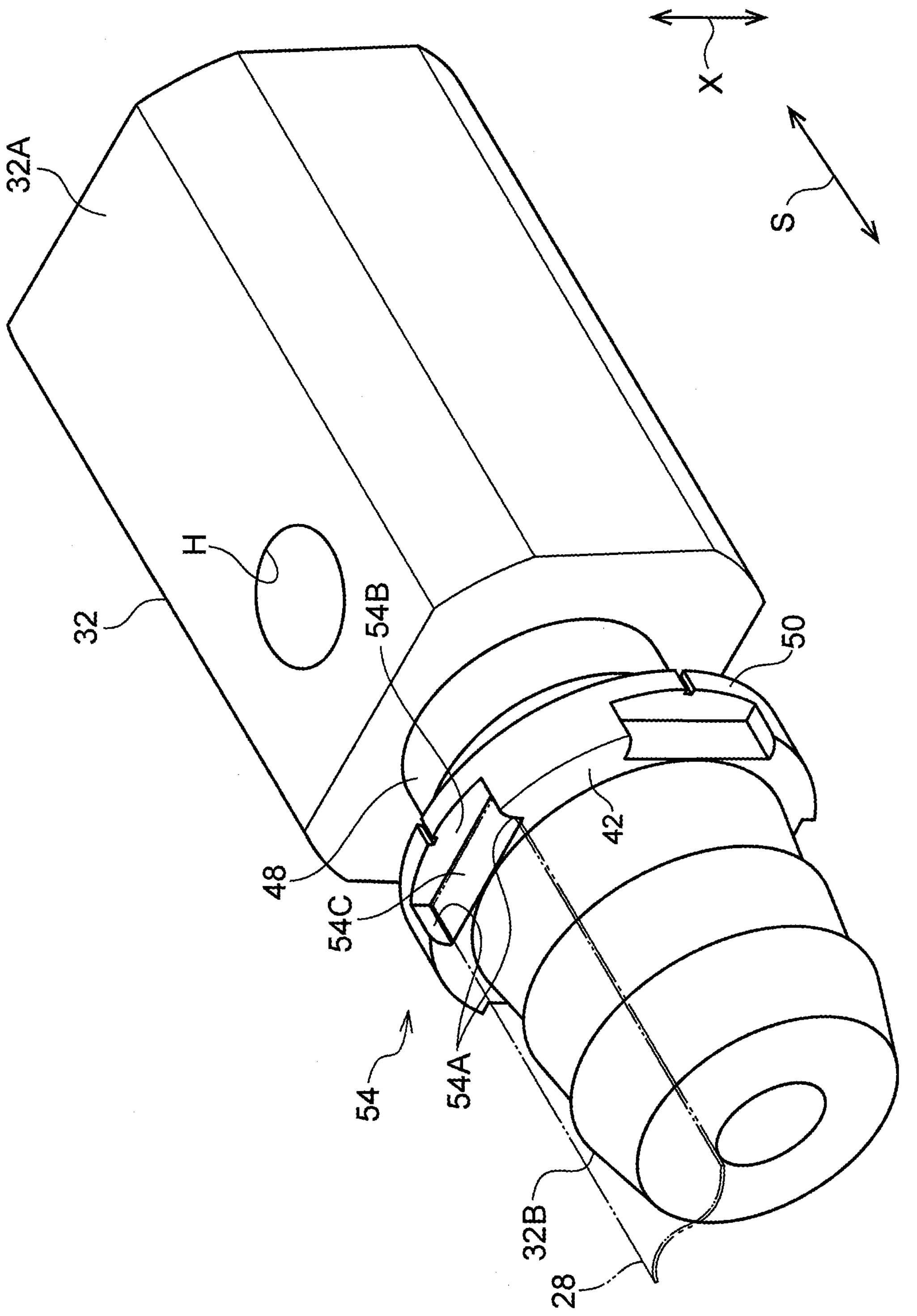
FIG. 6 is a perspective view depicting a sealing member according to a second exemplary embodiment of the present disclosure.
Figure 7:
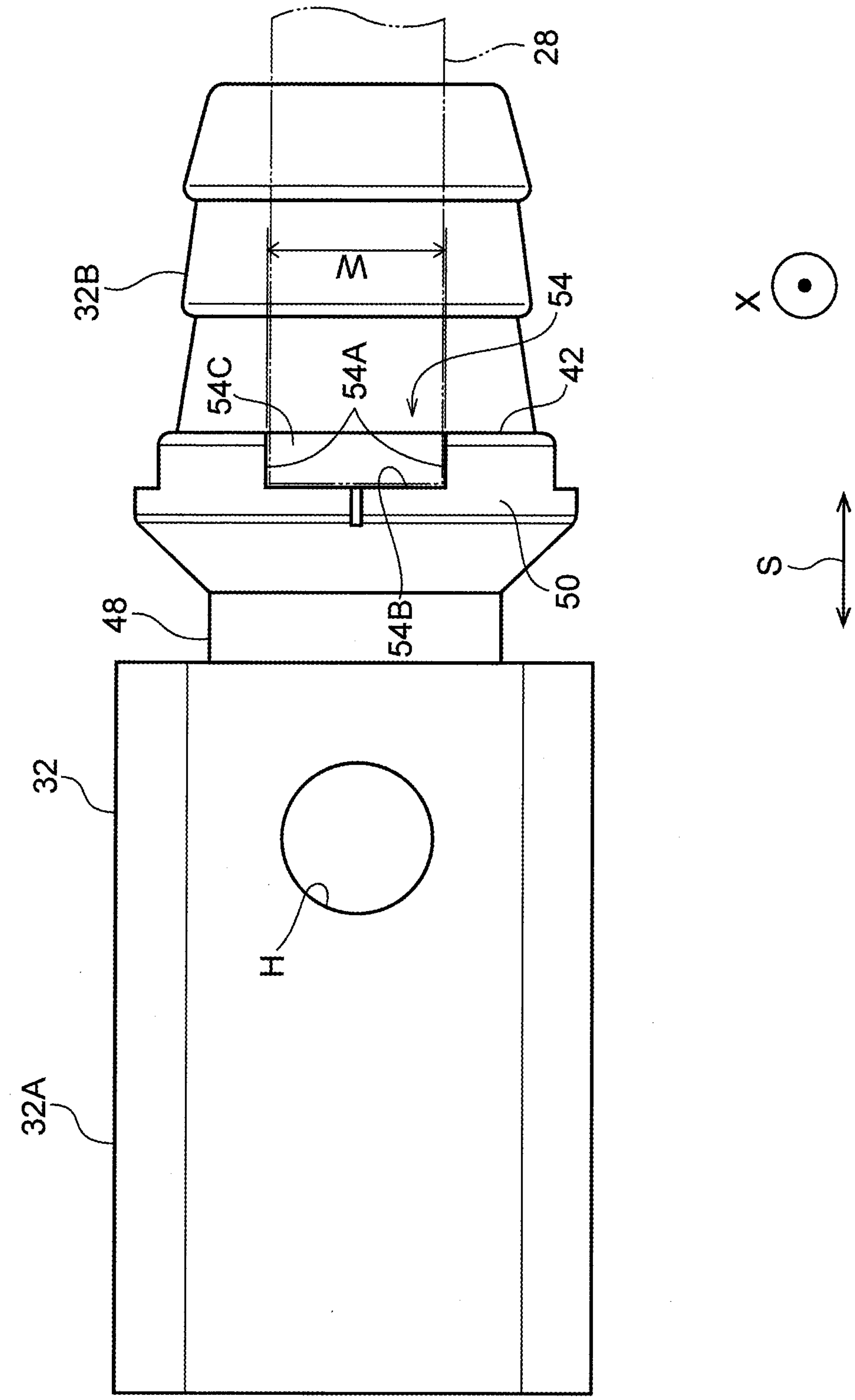
FIG. 7 is a plan view depicting the sealing member according to the second exemplary embodiment of the present disclosure.

FIG. 6 and FIG. 7 are diagrams showing the seal connector 32 according to the second exemplary embodiment of the present disclosure. As shown in FIG. 6 and FIG. 7, a slot 54 in the axial direction S is formed in the large diameter portion 50 of the seal connector 32. As illustrated in FIG. 6 and FIG. 7, four of the slots 54 are formed equidistantly in the circumferential direction as an example.

A width W of the slot 54 is slightly greater than the width of the restricting member 28, allowing the restricting member 28 to be interposed inside the slot 54. Therefore, circumferential side wall portions 54A, which are wall portions of the slot 54 that face in the circumferential direction, operate similarly to the first projections 44 according to the first exemplary embodiment. The length of the slot 54 in the axial direction S is suitably designed such that movement of the restricting member 28 in the circumferential direction can be limited in the state in which the restricting member 28 is sandwiched between the circumferential side wall portions 54A.

A portion of the slot 54 at the one side in the axial direction S serves as an axis side wall portion 54B against which the restricting member 28 may be butted. Therefore, the axis side wall portion 54B operates similarly to the first projections 44 according to the first exemplary embodiment.

A slot floor 54C, which is a floor portion of the slot 54, is formed in a substantially flat shape as illustrated in FIG. 6 and FIG. 7. Therefore, in the state in which the restricting member 28 is disposed in the slot 54, a gap is unlikely to form between the slot floor 54C and a back face (the radially inward face) of the restricting member 28.

Thus, the present exemplary embodiment may also provide the same operation and effects as the hydraulic actuator 20 according to the first exemplary embodiment.

Variant Examples

In the descriptions above, the second sealing member 30B includes the positioning members, but the hydraulic actuator 20 according to the present disclosure is not limited thus. That is, a structure is applicable in which positioning members are not provided at one of the first sealing member 30A and the second sealing member 30B. In this structure, the other of the first sealing member 30A and the second sealing member 30B includes the positioning members. Therefore, the hydraulic actuator 20 may be provided in which aligning the direction of extension of the restricting member 28 with the axial direction S of the tube 24 is easy.

In the descriptions above, the positioning members are crimped together with the sleeve 26 and the tube 24 by the crimping member 36, but the hydraulic actuator 20 according to the present disclosure is not limited thus. That is, a structure is applicable in which the positioning members are not crimped together with the sleeve 26 and tube 24. Even with this structure, the hydraulic actuator 20 may be provided in which aligning the direction of extension of the restricting member 28 with the axial direction S of the tube 24 is easy.

In the descriptions above, the positioning members include the second projection 46, but the hydraulic actuator 20 according to the present disclosure is not limited thus. A structure is applicable in which the positioning members do not include the second projection 46. Even with this structure, the hydraulic actuator 20 may be provided in which aligning the direction of extension of the restricting member 28 with the axial direction S of the tube 24 is easy.

In the descriptions above, a pair of the first projections 44 between which the restricting member 28 is disposed and that limit movement of the restricting member 28 in the circumferential direction are formed at the positioning members at the first sealing member 30A or second sealing member 30B, but the hydraulic actuator 20 according to the present disclosure is not limited thus. That is, a structure is applicable in which positioning members are different from the first projections 44 according to the present disclosure. For example, a structure is applicable in which a positioning member is a pin that protrudes in the radial direction, a hole is formed in the restricting member 28, and movement of the restricting member 28 in the circumferential direction is limited by engagement of the hole with the pin. Even with this structure, the hydraulic actuator 20 may be provided in which aligning the direction of extension of the restricting member 28 with the axial direction S of the tube 24 is easy.

In the descriptions above, the positioning members are formed at the one side in the axial direction S relative to the end of the tube 24, but the hydraulic actuator 20 according to the present disclosure is not limited thus. The positioning members may overlap with the end of the tube 24 at the one side in the axial direction S. For example, a hole may be formed in an end portion of the tube 24 at the one side in the axial direction S, and a positioning member that is the first projection 44 may pass through the hole. Thus, a shape may be formed in which the tube 24 and the positioning member do not interfere. Even with this structure, the hydraulic actuator 20 may be provided in which aligning the direction of extension of the restricting member 28 with the axial direction S of the tube 24 is easy.

Embodiments of the present disclosure are described above with reference to the attached drawings. It will be clear to the practitioner having ordinary skill in the field of art of the present disclosure that numerous modifications and applications are possible within the scope of the technical gist recited in the attached claims, and it should be understood that these modifications and applications are to be encompassed by the technical scope of the invention.

The disclosures of Japanese Patent Application No. 2022-162679 filed Oct. 7, 2022 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A hydraulic actuator, comprising:

a cylindrical tube that expands and contracts in accordance with pressure of a fluid;

a sleeve that covers an outer circumferential surface of the tube and that is widened in a radial direction by expansion of the tube while limiting elongation of the tube in an axial direction;

a restricting member that is provided radially inward of the sleeve from one side to another side in the axial direction, the restricting member resisting compression along the axial direction and being deformable in an intersecting direction that intersects the axial direction;

a pair of sealing members that seal respective ends of the tube at the one side and the other side in the axial direction; and a positioning member that is provided at a portion in a circumferential direction of at least one of the pair of sealing members, the positioning member positioning the restricting member such that the restricting member follows the axial direction.

2. The hydraulic actuator according to claim 1, wherein the positioning member is at the one side in the axial direction relative to the end of the tube.

3. The hydraulic actuator according to claim 1, wherein the positioning member includes a pair of projections between which the restricting member is disposed, the pair of projections limiting movement of the restricting member in the circumferential direction.

4. The hydraulic actuator according to claim 1, wherein the positioning member includes a second projection that limits movement of the restricting member in the axial direction at the sealing member.

5. The hydraulic actuator according to claim 1, wherein the sealing member includes:

an insertion portion that is inserted into the end of the tube, and a crimping member in a range of the insertion portion from the positioning member, the crimping member crimping the tube, the sleeve, and the restricting member to the sealing member from radially outward.

6. The hydraulic actuator according to claim 1, wherein the positioning member is provided at both of the pair of sealing members.

* * * * *